United States Patent
Song

(10) Patent No.: US 12,233,952 B2
(45) Date of Patent: Feb. 25, 2025

(54) VEHICLE BODY JOINT STRUCTURE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 299 days.

(21) Appl. No.: 17/882,160

(22) Filed: Aug. 5, 2022

(65) Prior Publication Data
US 2023/0202583 A1 Jun. 29, 2023

(30) Foreign Application Priority Data
Dec. 27, 2021 (KR) .................. 10-2021-0188689

(51) Int. Cl.
| B62D 27/06 | (2006.01) |
| B62D 25/02 | (2006.01) |
| B62D 25/04 | (2006.01) |
| B62D 25/08 | (2006.01) |
| B62D 27/02 | (2006.01) |

(52) U.S. Cl.
CPC ......... B62D 27/065 (2013.01); B62D 25/025 (2013.01); B62D 25/04 (2013.01); B62D 25/08 (2013.01); B62D 27/02 (2013.01)

(58) Field of Classification Search
USPC ....... 296/193.05, 35.1, 35.3, 193.06, 187.12, 296/209, 29, 30, 203.03; 293/135, 133
See application file for complete search history.

(56) References Cited

U.S. PATENT DOCUMENTS

| 5,332,281 | A * | 7/1994 | Janotik | B62D 21/02 |
| | | | | 52/696 |
| 8,657,368 | B2 * | 2/2014 | Freeman | B62D 25/087 |
| | | | | 296/205 |
| 9,821,854 | B2 * | 11/2017 | Bach | B62D 29/008 |
| 10,661,840 | B1 * | 5/2020 | Saje | B62D 25/2018 |
| 11,203,381 | B2 * | 12/2021 | Schuppert | B62D 25/025 |
| 11,654,974 | B2 * | 5/2023 | Choi | B62D 25/2036 |
| | | | | 296/193.05 |
| 11,679,660 | B2 * | 6/2023 | Alwan | B60K 1/04 |
| | | | | 180/68.5 |
| 2005/0046215 | A1 * | 3/2005 | Chung | F16F 1/3814 |
| | | | | 296/29 |
| 2011/0233970 | A1 * | 9/2011 | Nagai | B62D 29/007 |
| | | | | 296/203.03 |
| 2020/0140018 | A1 * | 5/2020 | Grottke | B62D 27/065 |

* cited by examiner

*Primary Examiner* — Amy R Weisberg
*Assistant Examiner* — Veronica M Shull
(74) *Attorney, Agent, or Firm* — Slater Matsil, LLP

(57) ABSTRACT

An embodiment joint structure for a vehicle body is provided. The vehicle body includes an underbody and an upper body coupled to the underbody, and the joint structure includes a front bulkhead coupled to an inside of each side sill of a pair of side sills provided on both sides of the upper body, respectively, a rear bulkhead coupled to the inside of each side sill of the pair of side sills on a rear side of the front bulkhead, and a support bracket coupled to the front bulkhead and the rear bulkhead along a length direction of the vehicle body.

19 Claims, 10 Drawing Sheets

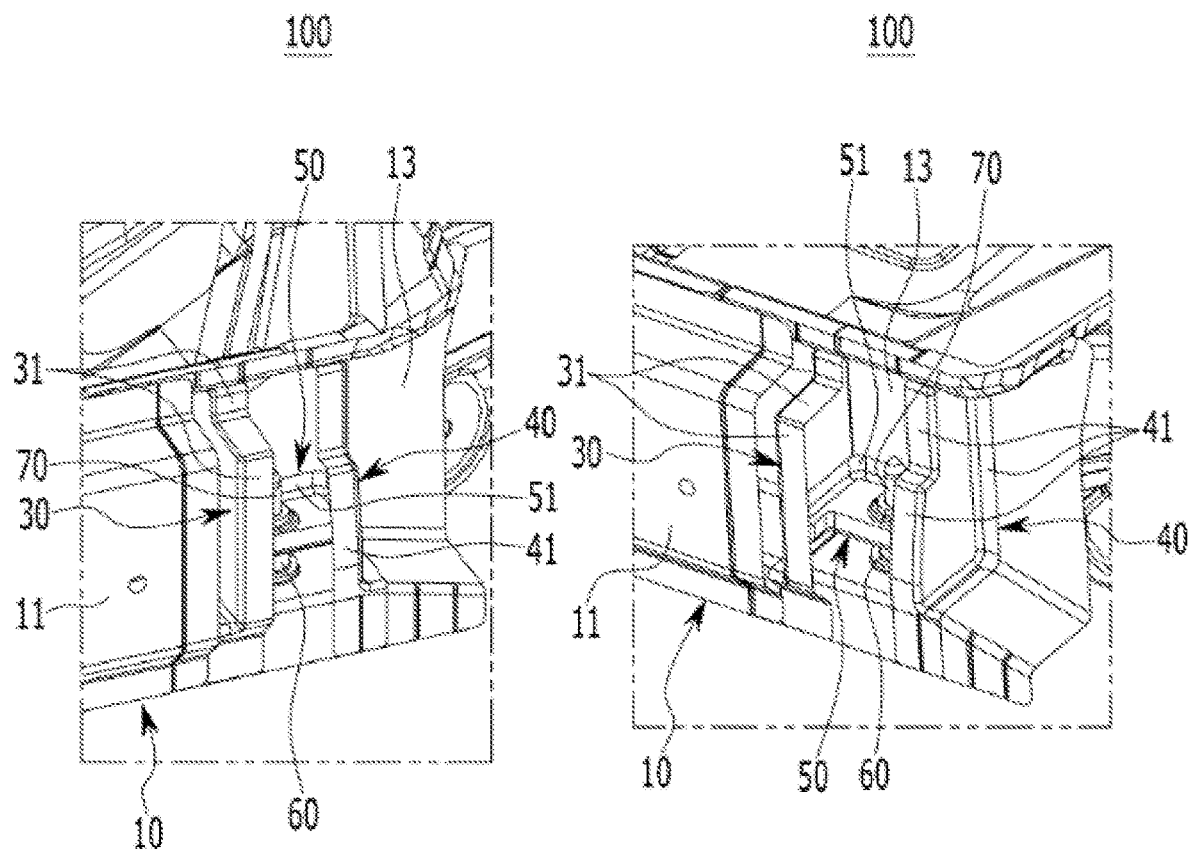

(A-A)

(B-B)

VEHICLE BODY JOINT STRUCTURE

CROSS-REFERENCE TO RELATED APPLICATIONS

This application claims the benefit of Korean Patent Application No. 10-2021-0188689, filed on Dec. 27, 2021, which application is hereby incorporated herein by reference.

TECHNICAL FIELD

An embodiment of the present invention relates to a vehicle body joint structure.

BACKGROUND

Recently, a vehicle industry has introduced a new concept of future mobility visions for realizing a human-centered dynamic future city. One of these future mobility solutions is a PBV (purpose-built vehicle) as a purpose-based mobility.

For example, the PBV is an environment-friendly mobility solution that provides customized services necessary for occupants during the time of moving to the destination on the ground, and it may also perform setting of an optimal path and cluster driving for each situation using electric vehicle-based artificial intelligence. Furthermore, the PBV vehicle is manufactured in a form of a box with a wide interior space.

The vehicle body of such a PBV vehicle is composed of an underbody (referred to as a rolling chassis or a skateboard in the industry) and an upper body assembled to the underbody.

For the vehicle body of such a PBV vehicle, it is most important to secure mounting robustness of the members constituting the front part of the upper body. Therefore, the vehicle body of the PBV vehicle must have characteristics that may effectively distribute the load (e.g., a torsional load) applied to the vehicle body while securing a joint strength for mounting parts of the underbody and the upper body.

The above information disclosed in this background section is only for enhancement of understanding of the background of the invention, and therefore it may contain information that does not form the prior art that is already known to a person of ordinary skill in the art.

SUMMARY

An embodiment of the present invention relates to a vehicle body joint structure. Particular embodiments relate to a vehicle body joint structure of a purpose-built vehicle (PBV).

Embodiments of the present invention provide a vehicle body joint structure capable of easily distributing a load applied to the mounting portion of the underbody to the upper body while securing joint strength for the mounting part of the underbody and the upper body.

A vehicle body joint structure according to an embodiment of the present invention including an underbody and an upper body engaged with the underbody may include a front bulkhead coupled to an inside of side sills respectively provided on both sides of the upper body, a rear bulkhead coupled to the inside of the side sills on a rear side of the front bulkhead, and a support bracket coupled to the front bulkhead and the rear bulkhead along the vehicle body length direction.

In the vehicle body joint structure according to an embodiment of the present invention, the upper body may include rear pillars coupled to the side sills.

In the vehicle body joint structure according to an embodiment of the present invention, the front bulkhead and the rear bulkhead may be coupled to each of the rear pillars.

In the vehicle body joint structure according to an embodiment of the present invention, each rear pillar may include a pillar outer member and a pillar inner member bonded to each other.

In the vehicle body joint structure according to an embodiment of the present invention, each side sill may include a sill outer member and a sill inner member bonded to each other.

In the vehicle body joint structure according to an embodiment of the present invention, the front bulkhead and the rear bulkhead may be bonded to the sill inner member and the pillar inner member along the vehicle width direction.

In the vehicle body joint structure according to an embodiment of the present invention, the rear pillar may include a rear flange portion in which a rear end portion of the pillar outer member and a rear end portion of the pillar inner member are bonded to each other.

In the vehicle body joint structure according to an embodiment of the present invention, the pillar outer member may be bonded to the sill outer member.

In the vehicle body joint structure according to an embodiment of the present invention, the front bulkhead may be joined to the rear end portion of the pillar inner member at the sill inner member and the rear flange portion along the vehicle width direction.

In the vehicle body joint structure according to an embodiment of the present invention, the rear bulkhead may be joined to the extending portion extending forward at the sill inner member and the rear end portion of the pillar inner member along the vehicle width direction.

In the vehicle body joint structure according to an embodiment of the present invention, the front bulkhead may include a first bonding flange portion extending rearward from the edge portion.

In the vehicle body joint structure according to an embodiment of the present invention, the first bonding flange portion may be bonded to the sill inner member and the pillar inner member.

In the vehicle body joint structure according to an embodiment of the present invention, the rear bulkhead may include a second bonding flange portion extending forward and rearward from the edge portion.

In the vehicle body joint structure according to an embodiment of the present invention, the second bonding flange portion may be bonded to the sill inner member and the pillar inner member.

In the vehicle body joint structure according to an embodiment of the present invention, the support bracket may include a third bonding flange portion extending in the upper direction from the edge portion.

In the vehicle body joint structure according to an embodiment of the present invention, the third bonding flange portion may be bonded to the facing surfaces of the front bulkhead and the rear bulkhead and is bonded to the sill inner member.

The vehicle body joint structure according to an embodiment of the present invention may further include a pipe nut penetrating the support bracket in the vertical direction and joined to the support bracket and each side sill and a mounting bolt engaged with a mounting portion provided on the underbody and the pipe nut.

In the vehicle body joint structure according to an embodiment of the present invention, the front bulkhead, the rear bulkhead, and the support bracket may distribute a load applied to the mounting portion into a vehicle body length direction, a vehicle width direction, and a vertical direction.

In the vehicle body joint structure according to an embodiment of the present invention, the front bulkhead, the rear bulkhead, and the support bracket may transfer the load applied to the mounting portion to the respective side sill and the respective rear pillar through the load path.

Therefore, the vehicle body joint structure according to an embodiment of the present invention may improve the torsional strength and durability performance of the vehicle body of the PBV vehicle, and improve NVH performance, R&H performance, and collision performance of the PBV vehicle.

In addition, the effects obtainable or predicted by the embodiments of the present invention are to be disclosed directly or implicitly in the detailed description of the embodiments of the present invention. That is, various effects predicted according to embodiments of the present invention will be disclosed in the detailed description to be described later.

BRIEF DESCRIPTION OF THE DRAWINGS

These drawings are for reference only in describing exemplary embodiments of the present invention, and therefore, the technical idea of the present invention should not be limited to the accompanying drawings.

FIGS. 2A, 2B, 3A, 3B, 4A, and 4B are perspective views showing a vehicle body joint structure according to an embodiment of the present invention.

Figure 1:
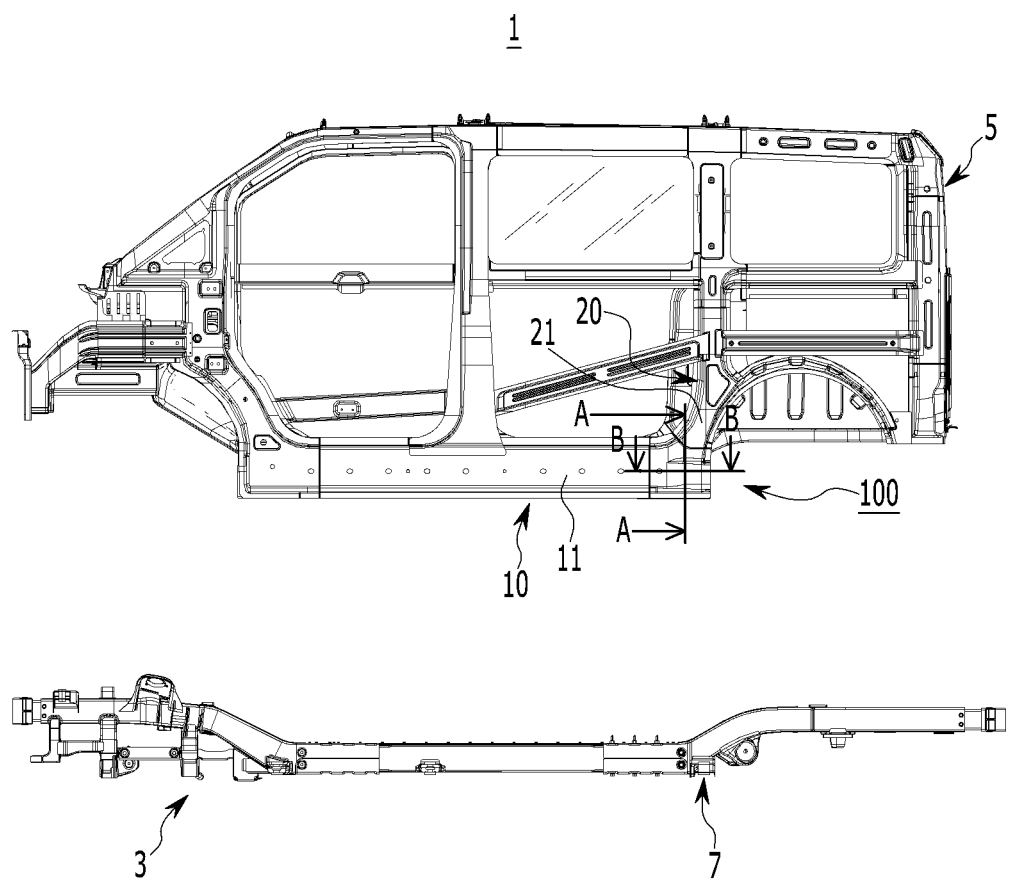
FIG. 1 is a view showing an example of a vehicle body of a PBV vehicle to which a vehicle body joint structure according to an embodiment of the present invention is applied.

The following reference identifiers may be used in connection with the accompanying drawings to describe exemplary embodiments of the present disclosure.

1: vehicle body
3: underbody
5: upper body
7: mounting portion
10: side sill
11: sill outer member
13: sill inner member
19: connection hole
20: rear pillar
21: pillar outer member
22, 24: rear end portion
23: pillar inner member
25: rear flange portion
27: extending portion
30: front bulkhead
31: first bonding flange portion
40: rear bulkhead
41: second bonding flange portion
50: support bracket
51: third bonding flange portion
53: penetration hole
60: pipe nut
61: hollow
70: mounting bolt
71: load path
100: vehicle body joint structure It should be understood that the above-referenced drawings are not necessarily to scale, presenting a somewhat simplified representation of various preferred features illustrative of the basic principles of the disclosure. The specific design features of embodiments of the present disclosure, including, for example, specific dimensions, orientations, locations, and shapes, will be determined in part by the particular intended application and use environment.

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present disclosure. As used herein, the singular forms are intended to include the plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or indirectly through one or more intermediary components, for example, by welding, self-piercing rivets (SPR), flow drill screws (FDS), structural adhesives, and the like.

The terms "vehicle", "of a vehicle", "automobile", or other similar terms used herein are generally used to cover various vehicles such as passenger vehicles including sports cars, sport utility vehicles (SUVs), buses, trucks, commercial vehicles, and the like, and cover hybrid vehicles, electric vehicles, hybrid electric vehicles, fuel cell electric vehicles, and other alternative fuel vehicles (i.e., vehicles driven by a fuel derived from resources other than petroleum).

Hereinafter, embodiments of the present invention will be described in detail with reference to the accompanying drawings.

FIG. 1 is a view showing an example of a vehicle body of a PBV vehicle to which a vehicle body joint structure according to an embodiment of the present invention is applied.

Referring to FIG. 1, the vehicle body joint structure 100 according to an embodiment of the present invention may be applied to a vehicle body 1 of a purpose built vehicle (hereinafter referred to as a 'PBV') in one example.

The PBV may be defined as an environment-friendly vehicle that is electric vehicle-based and provides a customized service for passengers while traveling to a destination. In one example, the PBV may be a box-type design vehicle (e.g., a robo-taxi vehicle or a hailing vehicle) having a wide interior space to move to the destination of the passenger in an unmanned autonomous driving manner.

The vehicle body 1 of such a PBV includes a skateboard-type underbody 3 (usually referred to as 'a rolling chassis' by those skilled in the art) and an upper body 5 engaged (mounted) to the underbody 3.

The underbody 3 may be provided as a chassis frame on which a battery assembly (not shown) may be mounted. And, the upper body 5 is a body in white (BIW) body coupled to the underbody 3 and may include a cabin.

In the present specification, for example, a reference direction for describing constituent elements may be set to be a vehicle body back and forth direction (e.g., a vehicle body length direction), a vehicle width direction, and a perpendicular direction.

"Upper end portion", "upper portion", "upper end", or "upper portion surface" of a component indicates an end portion, portion, an end, or a surface of the component that is relatively positioned higher in the drawing, and "lower end portion", "lower portion", "lower end", or "lower portion surface" of a component indicates an end portion, a portion, an end, or a surface of the component that is positioned relatively lower in the drawing.

"End" (for example, one end, another end, or the like) of a component indicates an end of the component in any direction, and "end portion" (for example, one end portion, another end portion, or the like) of a component indicates a certain part of the component including the end.

The vehicle body joint structure 100 according to an embodiment of the present invention includes a structure that may easily distribute the load applied to the mounting portion 7 of the underbody 3 to the upper body 5 while securing the joint strength for the mounting portions of the underbody 3 and the upper body 5.

Figures 2A, 2B:
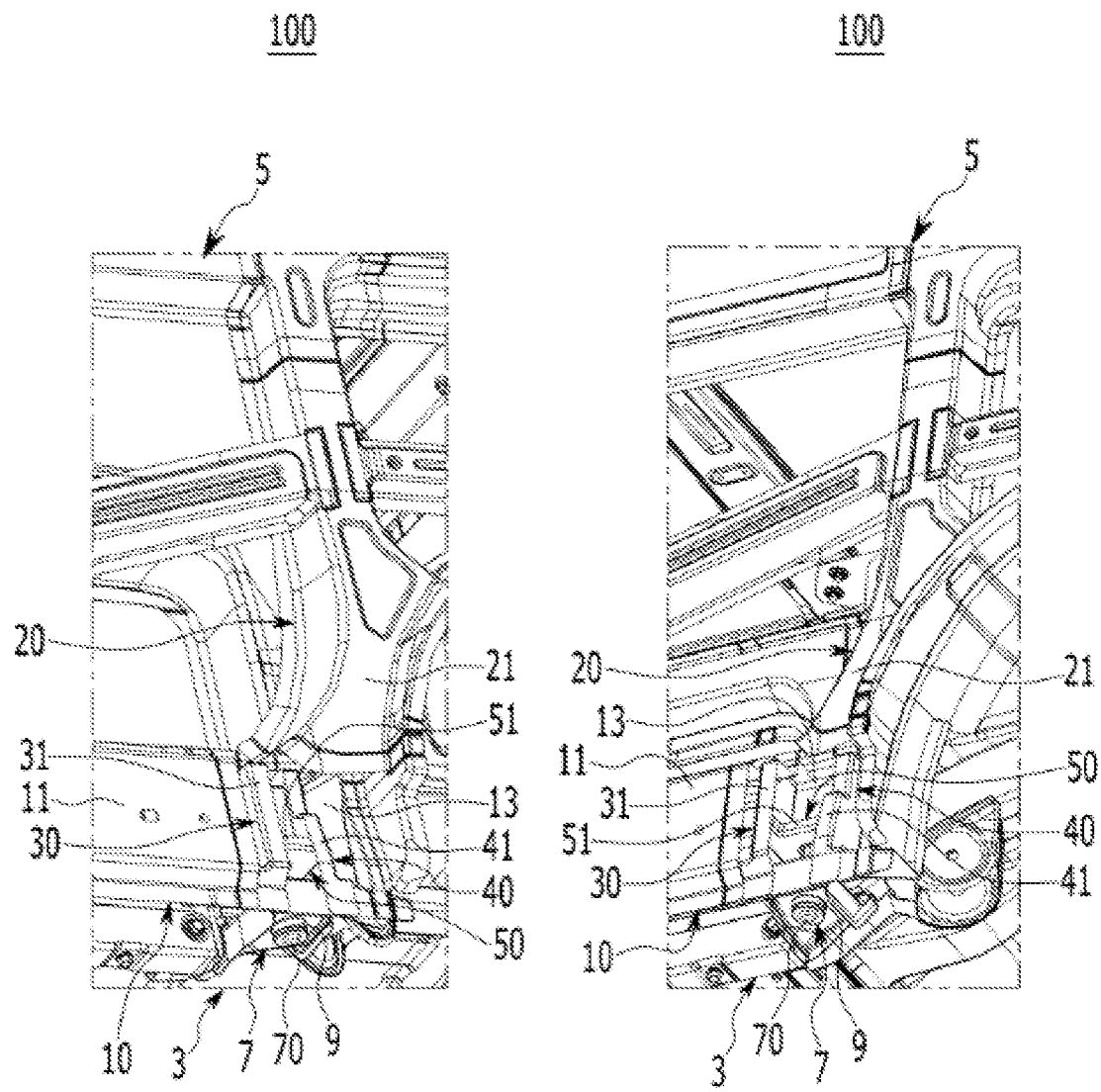
Figure 3A:
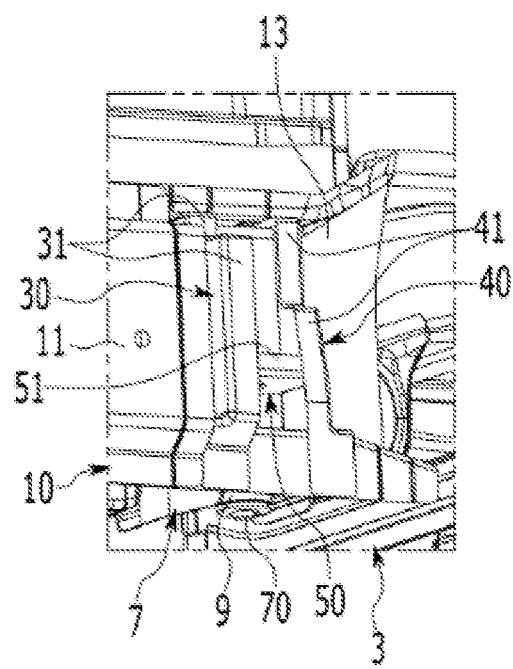
Figure 3B:
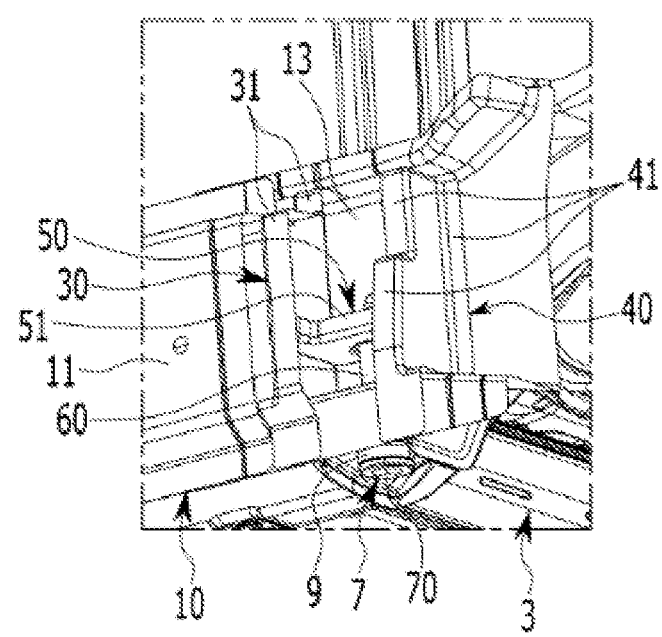

FIG. 2 to FIG. 4 are perspective views showing a vehicle body joint structure according to an embodiment of the present invention.

Referring to FIG. 1 to FIG. 4, the vehicle body joint structure 100 according to an embodiment of the present invention basically includes a front bulkhead 30, a rear bulkhead 40, a support bracket 50, a pipe nut 60, and a mounting bolt 70.

Prior to describing the constituent elements as set forth above, the upper body 5 according to an embodiment of the present invention includes side sills 10 respectively provided on both sides along the vehicle width direction and rear pillars 20 coupled to each side sill 10.

Figure 5:
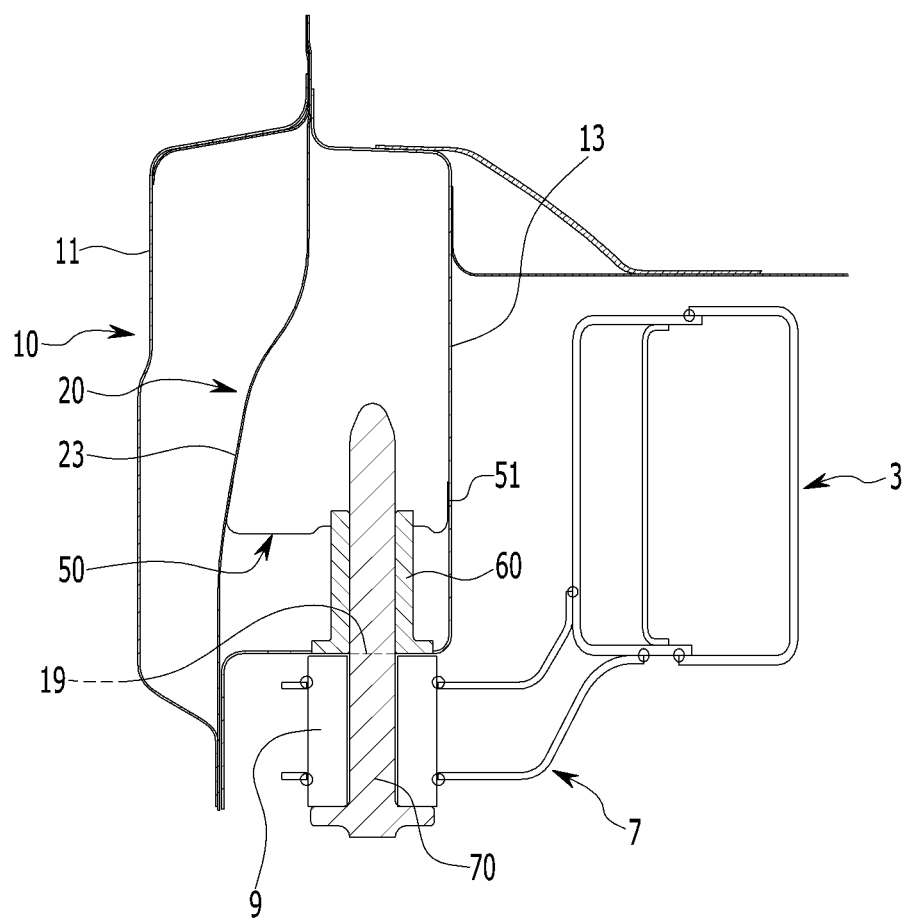
FIG. 5 and FIG. 6 are cross-sectional views showing a vehicle body joint structure according to an embodiment of the present invention taken along lines A-A and B-B of FIG. 1.
Figure 6:
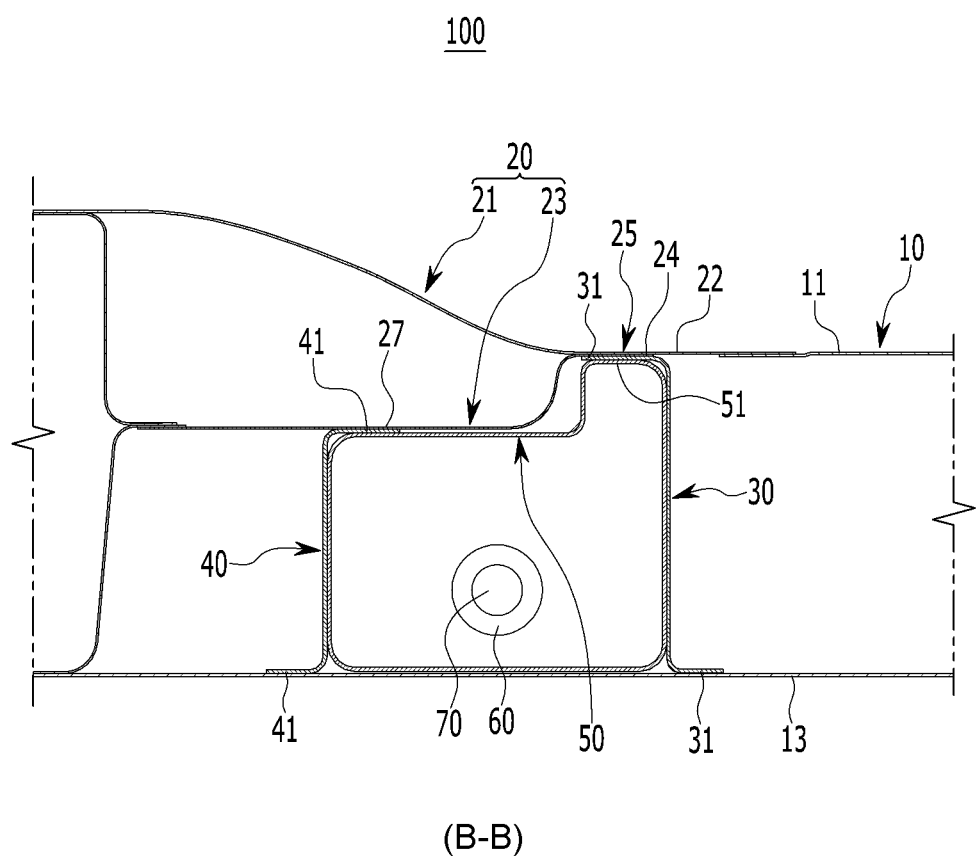

FIG. 5 and FIG. 6 are cross-sectional views showing a vehicle body joint structure according to an embodiment of the present invention taken along lines A-A and B-B of FIG. 1.

Referring to FIG. 1 to FIG. 6, each side sill 10 is disposed along the vehicle body back and forth direction on both sides along the vehicle width direction of the upper body 5. Each of these side sills 10 includes a sill outer member 11 and a sill inner member 13 bonded to each other.

Then, each of the rear pillars 20 is coupled to the rear portion of each side sill 10 and is disposed along the vertical direction. Each of the rear pillars 20 includes a pillar outer member 21 and a pillar inner member 23 that are bonded to each other.

Here, the pillar outer member 21 is bonded to the sill outer member 11. The pillar inner member 23 is disposed between the sill outer member 11 and the sill inner member 13 so that the cross-section of each side sill 10 is bisected.

In addition, each of the rear pillars 20 includes a rear flange portion 25 formed by joining the rear end portion 22 of the pillar outer member 21 and the rear end portion 24 of the pillar inner member 23 to each other.

Furthermore, the sill outer member 11 of each side sill 10 may be provided shorter than the length of the sill inner member 13 based on the rear portion. Accordingly, the rear end portion 22 of the pillar outer member 21 of each of the rear pillars 20 may be joined to the rear portion of the sill outer member 11 and the rear end portion 24 of the pillar inner member 23.

In an embodiment of the present invention, the front bulkhead 30 is adapted to reinforce each side sill 10. The front bulkhead 30 may be disposed on the rear portion of each side sill 10.

The front bulkhead 30 may be coupled to the inside of each side sill 10 and may be coupled to each rear pillar 20.

Specifically, the front bulkhead 30 is joined to the sill inner member 13 of each side sill 10 and the pillar inner member 23 of each rear pillar 20 along the vehicle width direction.

Furthermore, the front bulkhead 30 may be joined to the rear end portion 24 of the pillar inner member 23 along the vehicle width direction at the sill inner member 13 and the rear flange portion 25 of each rear pillar 20.

Here, the front bulkhead 30 includes a first bonding flange portion 31 extending rearward from the edge portion. The first bonding flange portion 31 is bonded to the sill inner member 13 and the pillar inner member 23 along the vehicle width direction. That is, the first bonding flange portion 31 may be bonded to the rear end portion 24 of the pillar inner member 23 along the vehicle width direction at the sill inner member 13 and the rear flange portion 25 of each rear pillar 20.

In an embodiment of the present invention, the rear bulkhead 40 is adapted to reinforce each side sill 10 together with the front bulkhead 30. The rear bulkhead 40 may be disposed at the rear portion of each side sill 10.

The rear bulkhead 40 may be coupled to the inside of each side sill 10 at the rear side of the front bulkhead 30 and coupled to each rear pillar 20.

Specifically, the rear bulkhead 40 is joined to the sill inner member 13 of each side sill 10 and the pillar inner member 23 of each rear pillar 20 along the vehicle width direction.

Furthermore, the rear bulkhead 40 may be joined to the sill inner member 13 and the extending portion 27 extending forward from the rear end portion 24 of the pillar inner member 23 along the vehicle width direction.

Here, the rear bulkhead 40 includes a second bonding flange portion 41 extending forward and rearward from the edge portion. The second bonding flange portion 41 is bonded to the sill inner member 13 and the pillar inner member 23 along the vehicle width direction. That is, the second bonding flange portion 41 may be bonded to the sill inner member 13 and the extending portion 27 extending forward from the rear end portion 24 of the pillar inner member 23 along the vehicle width direction.

In an embodiment of the present invention, the support bracket 50 is adapted to support a front bulkhead 30 and a rear bulkhead 40, and a pipe nut 60, which is described further later.

The support bracket 50 is disposed between the front bulkhead 30 and the rear bulkhead 40. The support bracket 50 is bonded to the front bulkhead 30 and the rear bulkhead 40 along the vehicle body back and forth direction. The support bracket 50 is bonded to the sill inner member 13 of each side sill 10.

This support bracket 50 includes a third bonding flange portion 51 extending in the upper direction from the edge portion. The third bonding flange portion 51 is bonded to the surfaces facing each other along the vehicle body back and forth direction of the front bulkhead 30 and the rear bulkhead 40 and may be bonded to the sill inner member 13.

Figures 7A, 7B:
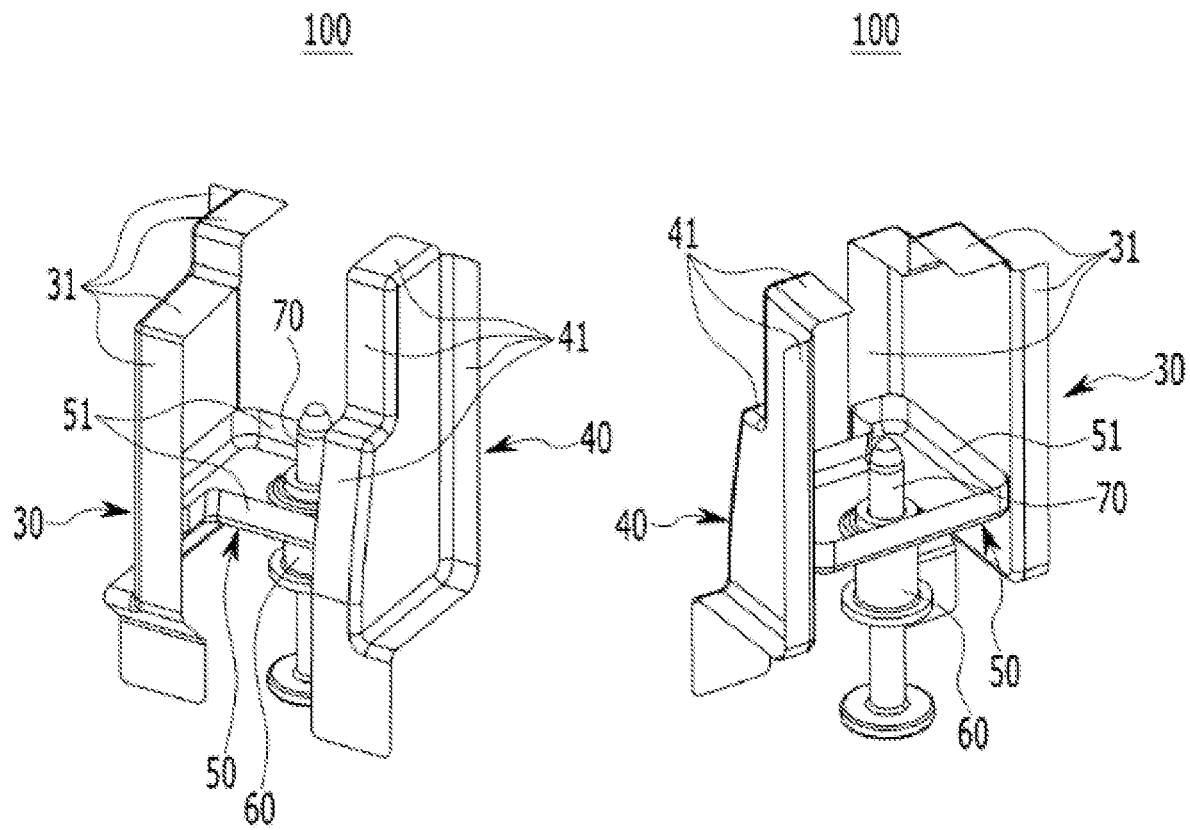
FIGS. 7A, 7B, and 8 are partial exploded perspective views showing a vehicle body joint structure according to an embodiment of the present invention.
Figure 8:
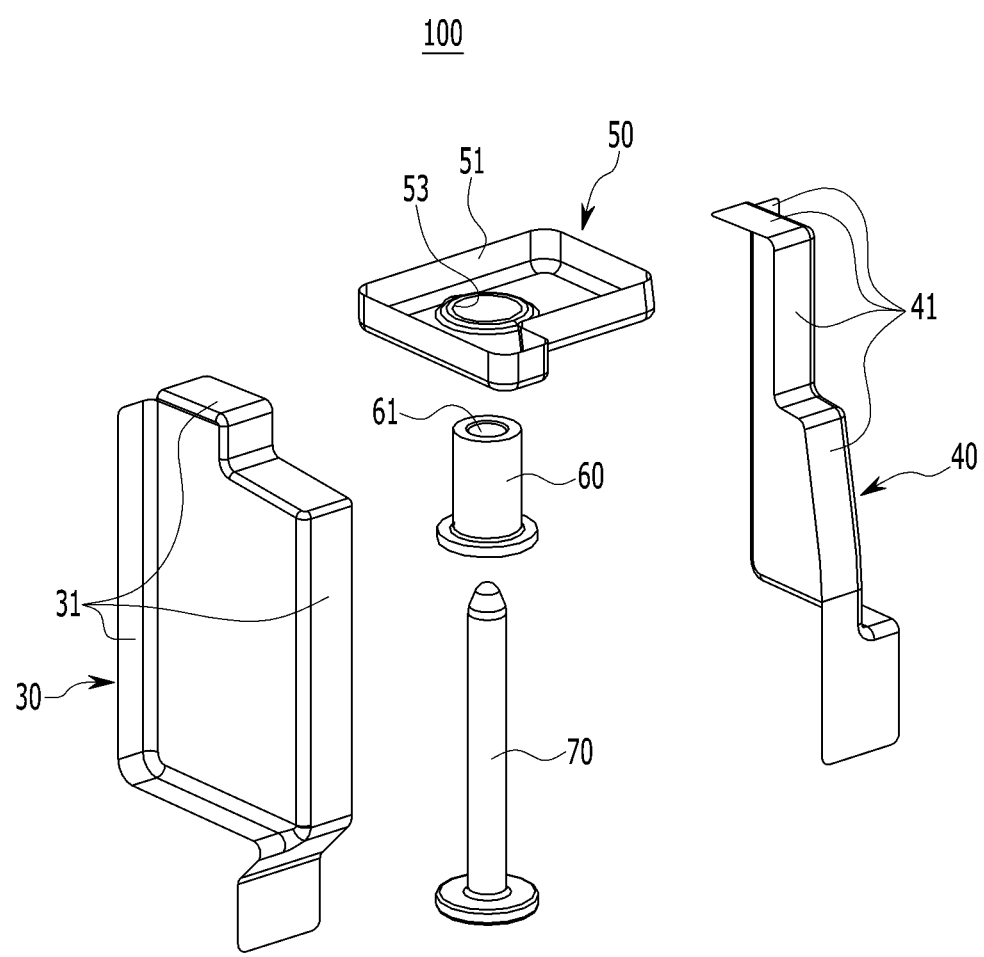

FIG. 7 and FIG. 8 are partial exploded perspective views showing a vehicle body joint structure according to an embodiment of the present invention.

Referring to FIG. 1 to FIG. 8, in an embodiment of the present invention, the pipe nut 60 penetrates the penetration hole 53 formed in the support bracket 50 in the vertical direction, and then is joined to the support bracket 50 and each side sill 10.

Here, the pipe nut 60 may be inserted along the vertical direction into the penetration hole 53 of the support bracket 50 and joined to the edge portion of the penetration hole 53. And, the lower end portion of the pipe nut 60 may be joined to the sill inner member 13 in each side sill 10. Furthermore, the hollow 61 of the pipe nut 60 may be connected with the connection hole 19 formed in the sill inner member 13.

In an embodiment of the present invention, the mounting bolt 70 is adapted to engage the underbody 3 and the upper body 5. The mounting bolt 70 may be engaged to the mounting portion 7 and the pipe nut 60 provided on the underbody 3.

Here, the mounting portion 7 may be mounted at a position corresponding to each rear pillar 20 in the rear portion of the underbody 3. In one example, the mounting portion 7 may be a mounting bracket to which a weld nut 9 is mounted.

Figure 9:
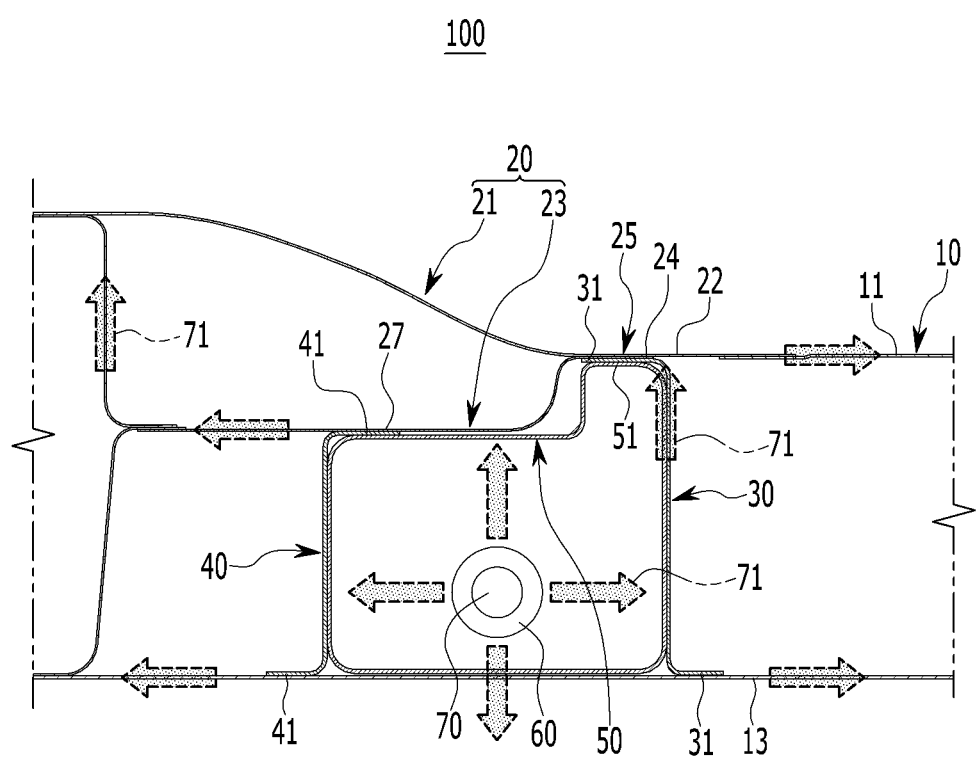
FIG. 9 and FIG. 10 are views for explaining an operation of a vehicle body joint structure according to an embodiment of the present invention.
Figure 10:
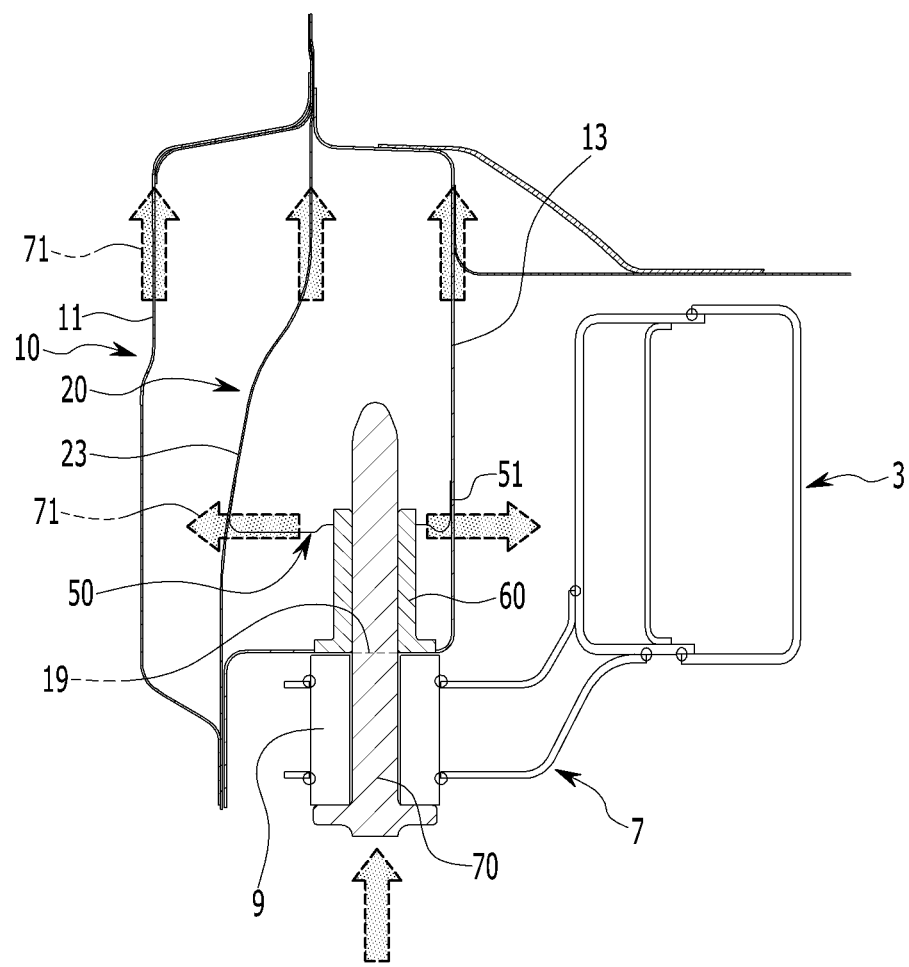

Hereinafter, the operation of the vehicle body joint structure 100 according to an embodiment of the present invention configured as described above is described in detail with reference to FIG. 9 and FIG. 10. FIG. 9 and FIG. 10 are views for explaining an operation of a vehicle body joint structure according to an embodiment of the present invention.

Referring to FIG. 9 and FIG. 10, the vehicle body joint structure 100 according to an embodiment of the present invention includes a front bulkhead 30 and a rear bulkhead 40 joined to a sill inner member 13 and a pillar inner member 23.

The vehicle body joint structure 100 according to an embodiment of the present invention is coupled to the front bulkhead 30 and the rear bulkhead 40 and includes a support bracket 50 coupled to the sill inner member 13.

Furthermore, in the vehicle body joint structure 100 according to an embodiment of the present invention, the support bracket 50 may be coupled to the pipe nut 60, and the pipe nut 60 may be engaged with the mounting portion 7 of the underbody 3 through the mounting bolt 70.

Here, the pillar inner member 23 of each rear pillar 20 coupled to the sill outer member 11 of each side sill 10 is configured to bisect the cross-section of each side sill 10, thereby improving the cross-section strength.

In addition, the front bulkhead 30 is bonded to the rear end portion 24 of the pillar inner member 23 at the sill inner member 13 and the rear flange portion 25 of each rear pillar 20. In addition, the rear bulkhead 40 is joined to the extending portion 27 extending forward at the sill inner member 13 and the rear end portion 24 of the pillar inner member 23.

Accordingly, the vehicle body joint structure 100 according to an embodiment of the present invention may form a load path 71 distributing the load (for example, the torsional load) applied to the mounting portion 7 of the underbody 3 to the vehicle body back and forth direction, the vehicle width direction and the vertical direction through the pipe nut 60, the support bracket 50, the front bulkhead 30, and the rear bulkhead 40.

Accordingly, the vehicle body joint structure 100 according to an embodiment of the present invention may distribute the load applied to the mounting portion 7 of the underbody 3 to each side sill 10 and each rear pillar 20 through the load path 71.

That is, in the vehicle body joint structure 100 according to an embodiment of the present invention, each rear pillar 20 functions to support the mounting portion 7 of the underbody 3.

According to the vehicle body joint structure 100 according to an embodiment of the present invention as described so far, it is possible to increase the joint strength and strength for the mounting portion of the underbody 3 and the upper body 5.

In addition, the vehicle body joint structure 100 according to an embodiment of the present invention may easily distribute the load applied to the mounting portion 7 of the underbody 3 in the vehicle body back and forth direction of the upper body 5, the vehicle width direction, and the vertical direction.

Therefore, the vehicle body joint structure 100 according to an embodiment of the present invention may improve the torsional strength and durability performance of the vehicle body 1 of the PBV vehicle, and improve NVH performance, R&H performance, and collision performance of the PBV vehicle.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A joint structure for a vehicle body, the vehicle body comprising an underbody and an upper body coupled to the underbody, the joint structure comprising:
   a front bulkhead coupled to an inside of each side sill of a pair of side sills provided on both sides of the upper body, respectively;
   a rear bulkhead coupled to the inside of each side sill of the pair of side sills on a rear side of the front bulkhead; and
   a support bracket coupled to the front bulkhead and the rear bulkhead along a length direction of the vehicle body;
   wherein the upper body comprises a pair of rear pillars coupled to each side sill of the pair of side sills, respectively; and
   wherein the front bulkhead and the rear bulkhead are directly coupled to each rear pillar of the pair of rear pillars.

2. The joint structure of claim 1, further comprising a pair of rear pillars coupled to each side sill of the pair of side sills, respectively, each rear pillar of the pair of rear pillars comprising a pillar outer member and a pillar inner member coupled to each other.

3. The joint structure of claim 1, further comprising:
a pipe nut penetrating the support bracket in a vertical direction and coupled to the support bracket and each side sill of the pair of side sills; and
a mounting bolt engaged with a mounting portion provided on the underbody and the pipe nut.

4. The joint structure of claim 3, wherein the front bulkhead, the rear bulkhead, and the support bracket are configured to distribute a load applied to the mounting portion along a load path in the length direction of the vehicle body, a vehicle width direction, and the vertical direction.

5. The joint structure of claim 4, wherein the front bulkhead, the rear bulkhead, and the support bracket are configured to transfer the load applied to the mounting portion to the respective side sill and the respective rear pillar through the load path.

6. A joint structure for a vehicle body, the vehicle body comprising an underbody and an upper body coupled to the underbody, the joint structure comprising:
a front bulkhead coupled to an inside of each side sill of a pair of side sills provided on both sides of the upper body, respectively, each side sill of the pair of side sills comprising a sill outer member and a sill inner member coupled to each other;
a rear bulkhead coupled to the inside of each side sill of the pair of side sills on a rear side of the front bulkhead;
a support bracket coupled to the front bulkhead and the rear bulkhead along a length direction of the vehicle body; and
a pair of rear pillars coupled to each side sill of the pair of side sills, respectively, each rear pillar of the pair of rear pillars comprising a pillar outer member and a pillar inner member coupled to each other;
wherein the front bulkhead and the rear bulkhead are coupled to the sill inner members and the pillar inner members along a vehicle width direction; and
wherein the front bulkhead and the rear bulkhead are directly coupled to each rear pillar of the pair of rear pillars.

7. The joint structure of claim 6, wherein:
each rear pillar of the pair of rear pillars comprises a rear flange portion in which a rear end portion of the pillar outer member and a rear end portion of the pillar inner member are coupled to each other; and
the pillar outer members are coupled to the sill outer members.

8. The joint structure of claim 7, wherein the front bulkhead is coupled to the rear end portions of the pillar inner members at the sill inner members and the rear flange portions along the vehicle width direction.

9. The joint structure of claim 8, wherein the rear bulkhead is coupled to extending portions extending forward at the sill inner members and the rear end portions of the pillar inner members along the vehicle width direction.

10. The joint structure of claim 9, wherein:
the front bulkhead comprises a first bonding flange portion extending rearward from an edge portion of the front bulkhead; and
the first bonding flange portion is coupled to the sill inner members and the pillar inner members.

11. The joint structure of claim 10, wherein:
the rear bulkhead comprises a second bonding flange portion extending forward and rearward from edge portions of the rear bulkhead; and
the second bonding flange portion is coupled to the sill inner members and the pillar inner members.

12. The joint structure of claim 11, wherein:
the support bracket comprises a third bonding flange portion extending in an upper direction from an edge portion of the support bracket; and
the third bonding flange portion is coupled to facing surfaces of the front bulkhead and the rear bulkhead and is coupled to the sill inner members.

13. A vehicle body comprising:
an underbody;
an upper body coupled to the underbody;
a pair of side sills provided on both sides of the upper body, respectively, the side sills extending in a length direction of the vehicle body and separated from each other in a width direction of the vehicle body, wherein the side sills each comprise a sill outer member and a sill inner member coupled to each other;
a pair of rear pillars coupled to each side sill of the pair of side sills, respectively, wherein the rear pillars each comprise a pillar outer member and a pillar inner member coupled to each other;
a front bulkhead coupled to an inside of the side sills;
a rear bulkhead coupled to the inside of the side sills on a rear side of the front bulkhead, wherein the front bulkhead and the rear bulkhead are coupled to the sill inner members and the pillar inner members along the width direction of the vehicle body;
a support bracket coupled to the front bulkhead and the rear bulkhead along the length direction of the vehicle body;
a pipe nut penetrating the support bracket in a vertical direction and coupled to the support bracket and the side sills; and
a mounting bolt engaged with a mounting portion provided on the underbody and the pipe nut.

14. The vehicle body of claim 13, wherein:
the rear pillars each comprise a rear flange portion in which a rear end portion of the pillar outer member and a rear end portion of the pillar inner member are coupled to each other; and
the pillar outer members are coupled to the sill outer members.

15. The vehicle body of claim 14, wherein the front bulkhead is coupled to the rear end portions of the pillar inner members at the sill inner members and the rear flange portions along the width direction of the vehicle body.

16. The vehicle body of claim 15, wherein the rear bulkhead is coupled to extending portions extending forward at the sill inner members and the rear end portions of the pillar inner members along the width direction of the vehicle body.

17. The vehicle body of claim 16, wherein:
the front bulkhead comprises a first bonding flange portion extending rearward from an edge portion of the front bulkhead; and
the first bonding flange portion is coupled to the sill inner members and the pillar inner members.

18. The vehicle body of claim 17, wherein:
the rear bulkhead comprises a second bonding flange portion extending forward and rearward from edge portions of the rear bulkhead; and
the second bonding flange portion is coupled to the sill inner members and the pillar inner members.

19. The vehicle body of claim 18, wherein:
the support bracket comprises a third bonding flange portion extending in an upper direction from an edge portion of the support bracket; and the third bonding flange portion is coupled to facing surfaces of the front bulkhead and the rear bulkhead and is coupled to the sill inner members.

\* \* \* \* \*